United States Patent [19]
Nowak

[11] Patent Number: 4,617,191
[45] Date of Patent: Oct. 14, 1986

[54] METHOD AND APPARATUS FOR COATING PARTICULATE MATERIALS WITH POWDERY MATERIALS

[75] Inventor: Reinhard Nowak, Binzen, Fed. Rep. of Germany

[73] Assignee: Glatt GmbH, Binzen, Fed. Rep. of Germany

[21] Appl. No.: 736,672

[22] Filed: May 22, 1985

[30] Foreign Application Priority Data

May 22, 1984 [DE] Fed. Rep. of Germany ....... 3418997

[51] Int. Cl.$^4$ .................... A23C 9/00; B29C 67/00; C05B 19/00
[52] U.S. Cl. .................... 426/294; 23/313 R; 127/21; 264/117; 425/222; 426/295; 426/285; 426/453
[58] Field of Search ............... 426/285, 453, 289, 293, 426/294, 295; 99/474; 425/222; 264/117; 23/313 R; 127/21

[56] References Cited

U.S. PATENT DOCUMENTS

3,632,257 1/1972 Ashizawa ........................ 23/313 R
3,966,975 6/1976 Hansen et al. .................... 426/285
4,062,641 12/1977 Hovmand et al. ................ 426/285

*Primary Examiner*—George Yeung
*Attorney, Agent, or Firm*—Fleit, Jacobson, Cohn & Price

[57] ABSTRACT

A method and apparatus for introducing a powdery substance to a particulate material contained within a rotary granulator. The powdery material is contained in a feeding hopper that is positioned above a nozzle that is in communication with a source of compressed air. The compressed air issues from the nozzle and draws from the supply funnel powdery material that is conveyed through a conduit that extends into the rotary granulator and is so oriented as to introduce the powdery material to the particulate material as it is being rotated. The compressed air can be introduced in the form of pulses by periodically interrupting the flow of air to thereby control the apportionment of the powdery substance.

14 Claims, 14 Drawing Figures

METHOD AND APPARATUS FOR COATING PARTICULATE MATERIALS WITH POWDERY MATERIALS

BACKGROUND OF THE INVENTION

The invention relates to a method for the mixing, drying, and granulating of solids while adding active powdery substances and microgranulates, as well as liquids and binders, and also to apparatus for carrying out the method, the apparatus including equipment for the addition of active powdery substances by means of compressed-air delivery and, if desired, including a device for the separate addition of liquid and binders into a rotary granulator.

DESCRIPTION OF THE PRIOR ART

Rotary granulators are known having a revolving rotor which may conveniently be lowered from an open into a closed position. While in its operating position, a minimal slit remains open through which an air barrier will be applied, whereupon filling of material can take place into a product container. A charge of material with grain sizes ranging from powder to pellets, i.e., very fine powder to a tablet size of 10 mm, is introduced into the product container of the rotary granulator. Due to the rotary movement of the rotor, a "bulge of material" will then be formed that performs a certain spiral movement along the outer edge of the rotor disc and on the adjoining inner jacket of the product container. From the movement of the rotor disc, as well as from the action of the centrifugal force and of the air that flows from below through the annular slit that is formed, there results a helical, bulge-shaped, circular movement of the material that then tumbles over and reverses into itself.

The receiving material, e.g., crystals of sugar or salt, receives an active powdery substance, in a known manner, and a binder is added separately in order to coat the particles of salt or sugar. When the active powdery substance required for the coating of the receiving material is introduced onto the receiving materials in the product container, there is a problem in that the active powdery substance cakes easily, so that its introduction cannot be effected easily in a continuous and steady manner. For that reason, a conveying or dispersing compressed-air stream is used to achieve satisfactory blending. When such an active powdery substance that is to be introduced into the product container is fed in, there results, however, the problem that the active powdery substance to be introduced cannot be apportioned sufficiently.

It is known that the active powdery substance to be introduced is added above the surface of the bulge of material formed in the product container of the rotary granulator. However, a design of that kind has the disadvantage that the air or gas flowing from below through the bulge of material may easily lift off the powdery material that was introduced above the surface of the bulge, and keep it at least partly out of the processing action, so that it will only partly participate in the process and in a manner that cannot be controlled. Moreover, this event may even have dangerous effects when toxic substances are used.

In a known manner, the liquid required by the granulating process is introduced into the product container of the rotary granulator at the same spot as the powdery material that is to be added and is conveyed by the compressed-air stream. But, a known design of that type has the disadvantage that any intimate mixture within the receiving material can be achieved only in an imperfect way.

SUMMARY OF THE INVENTION

The invention provides an improved method and an improved granulating device, by means of which the disadvantages resulting from the known arrangements can be prevented, and by means of which the quantity of the active powdery substance to be added as well as the quantity of the delivery air can be regulated precisely, while they are adapted to the requirements and facts of each case, and while caking of the active powdery substance to be added can be effectively prevented and a good intimate mixture and granulation can be achieved.

In accordance with the invention, there results the advantage that, in dependence on the requirements and facts of each case, a precise apportioning of the active powdery substances to be added to the receiving materials, as well as of the compressed-air stream conveying same, can be achieved in a simple and convenient way. A good intimate mixture of the active powdery material with the material in the product container can be achieved when the active powdery substance introduced is delivered wholly to the agglomeration process, and the air pocket, which favors the process of delivery of the powdery product into the receiving material in the product container, and which has been formed by the conveying compressed air, may be enlarged when desired, and that thereby the process of intimate mixing and the process of agglomeration can be improved.

DESCRIPTION OF THE PREFERRED EMBODIMENTS

Figure 1:
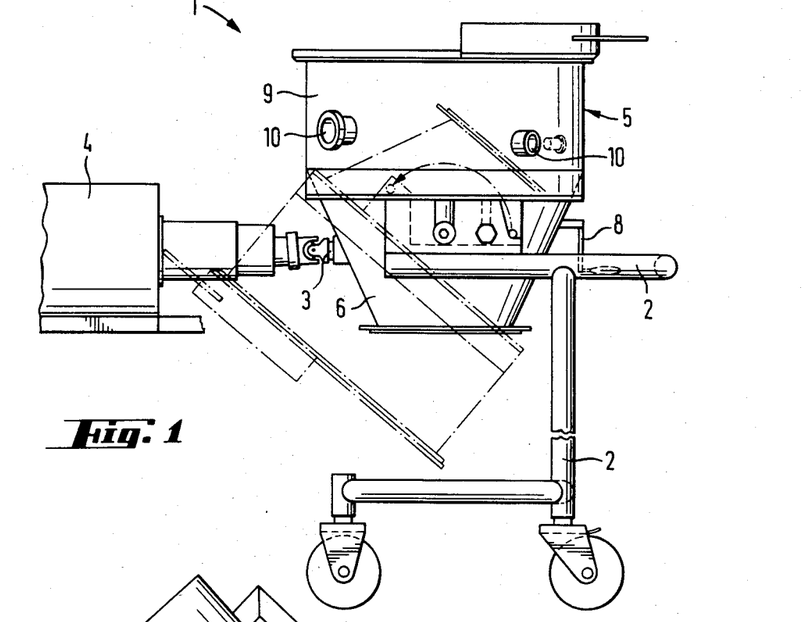
FIG. 1 shows a side view of a rotary granulator in accordance with the present invention, mounted on a chassis and including a product container.
Figure 2:
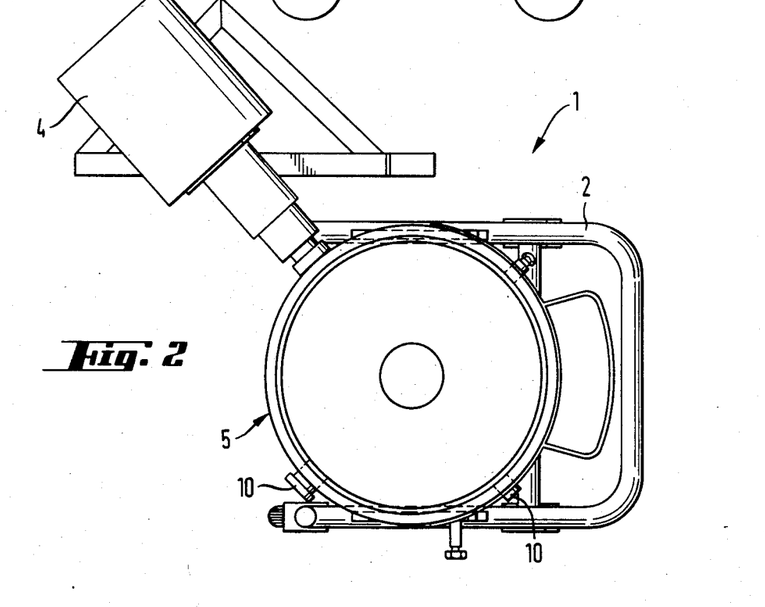
FIG. 2 shows a top view of the device illustrated in FIG. 1.
Figure 4:
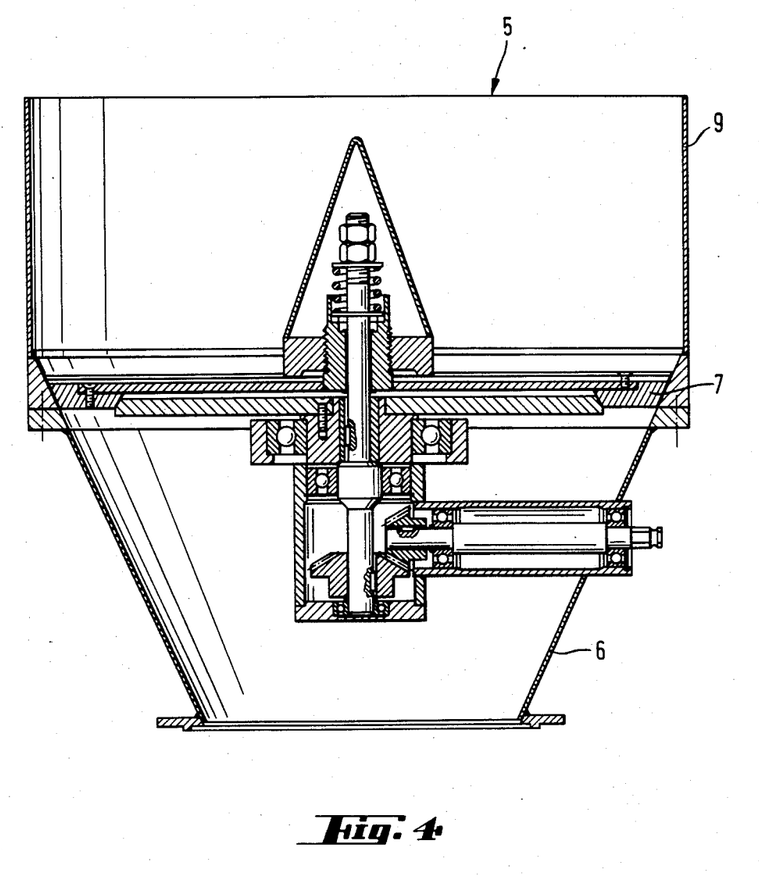
FIG. 4 shows a cross section of the product container of the rotary granulator shown in FIG. 3.
Figure 5:
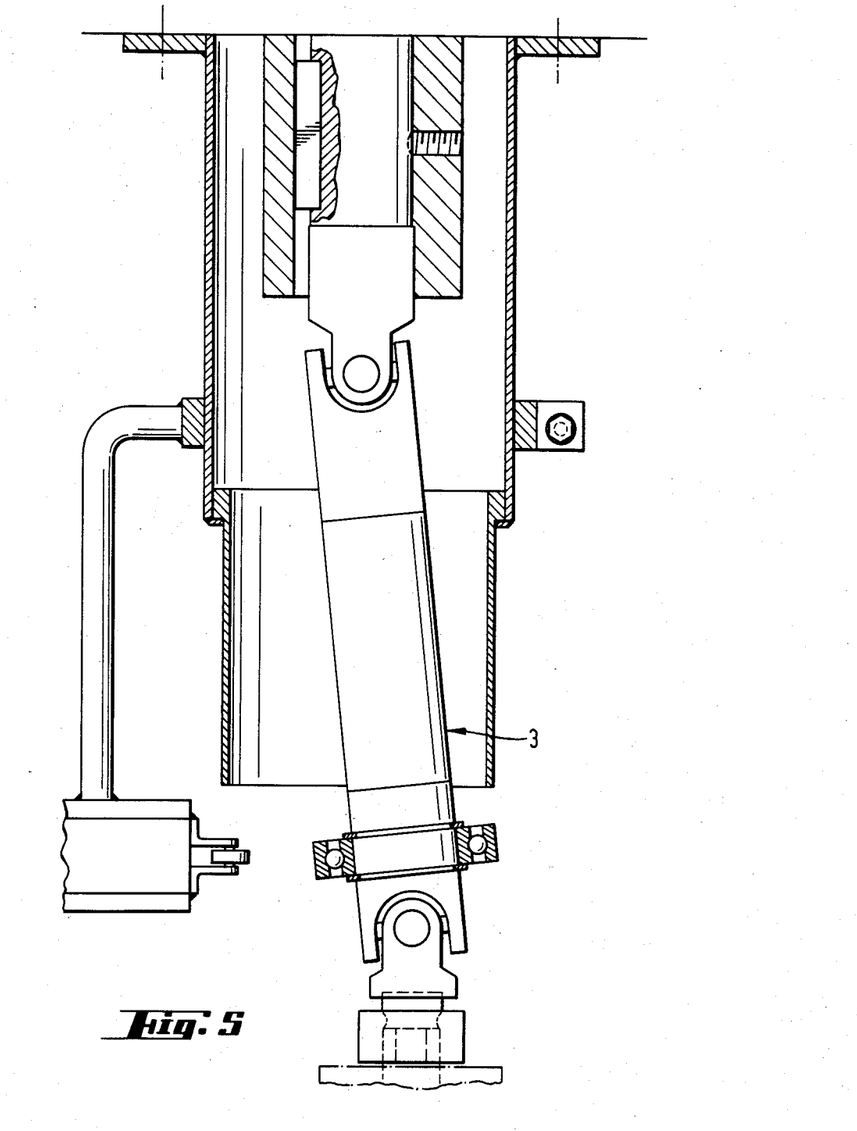
FIG. 5 shows a partial cross section of a driving shaft connecting a driving mechanism with the rotary granulator shown in FIGS. 1 and 2.

Referring to FIGS. 1 and 2, a rotary granulator 1 is mounted on a chassis 2 and may be connected with a driving motor 4 by way of a driving shaft 3 (also see FIG. 5). Granulator 1 includes a product container 5 (shown separately in FIGS. 3 and 4), having a lower, conically shaped casing section 6 in which a bearing of a rotor disc has been mounted. A rotor disc 7 (see FIG. 4), mounted above the conical section of the casing, may be lowered by means of a hand crank 8 to provide an annular slit of desired width. The width of the annular slit used to let air pass through may be adjusted by means of the hand crank 8.

Figure 3:
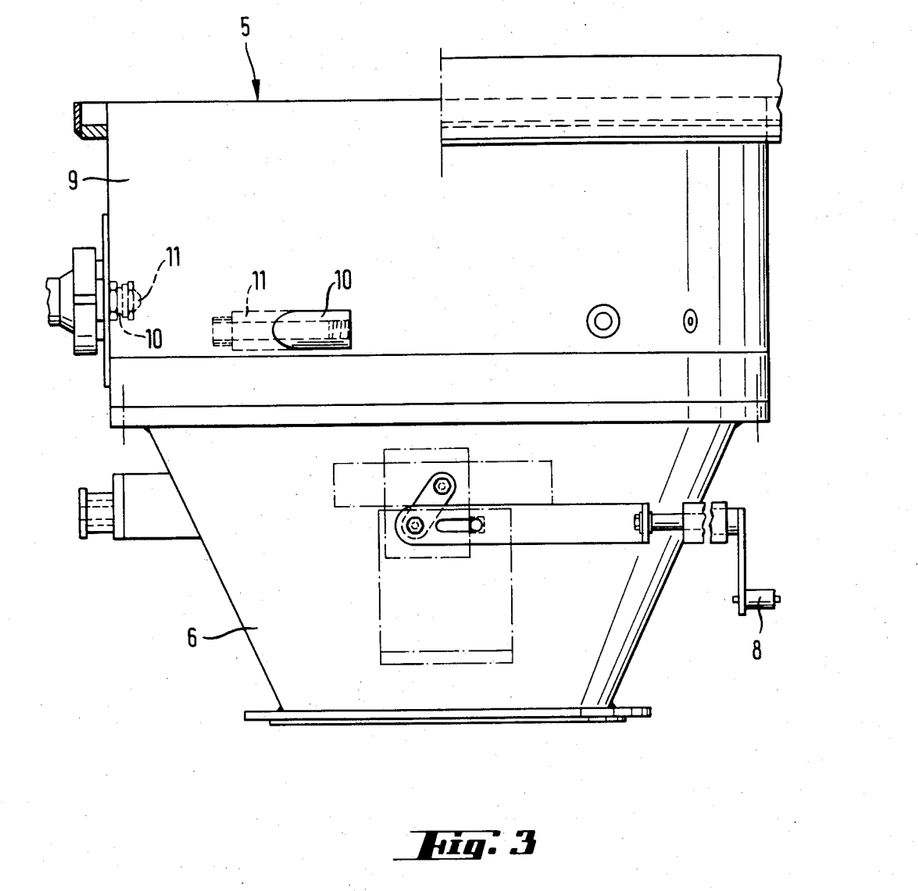
FIG. 3 shows a side view of the product container of the rotary granulator on an enlarged scale.

In the upper cylindrical part 9 of the casing of the product container 5, holders 10 for spray nozzles have been provided above the rotor disc 7, and in which outlet spray nozzles 11 of an apportioning apparatus (as described below) have been mounted. The nozzles are used for the addition of active powdery substances delivered by means of conveying compressed air to the receiving material to be processed, which has been introduced into the product container 5 earlier.

The method of operation of the rotary granulator 1 is as follows: filling materials in the form of solids with granulations ranging from powder to pellets, i.e., in grain sizes ranging from very fine powder to pellets of grain sizes of, possibly, up to 10 mm tablet size, are introduced into the product container 5 of the rotary granulator 1 as receiving materials for the execution of the granulation process. Subsequently, because of the rotary movement of the rotor, a bulge of the material, that undergoes a certain spiral movement on the outer edge of the rotor disc 7 and on the adjoining inner surface of the cylindrical casing section 9, forms in the upper casing section 9 of the product container 5. From the movement of the rotor disc 7 at peripheral speeds of from about 0 to 12.5 m/sec, as well as by centrifugal force, there results a movement of the material toward the outer edge of the disc. Due to the action of the air stream that escapes upwardly from the lower conical casing section 6 through the annular slit formed between the vertically movable rotor disc 7 and the bearing of the rotor disc into the upper cylindrical casing section 9, a helical, bulge-shaped, circular movement of the material in the product container 5 is achieved, reversing approximately into itself by tumbling onto itself. Depending on the type of material to be processed, a spraying material is introduced into the bulge of material by means of an apportioning device. The wetted particles will reverse onto themselves and come down once more in the center of the rotor disc 7, and subsequently will be accelerated outwardly again, so that the process will repeat itself. For the purpose of performing the agglomeration process, a solid in the form of an active powdery substance or a solution of powdery material and a separately introduced solution of a binder material can be added to the receiving material, which can be, e.g., sugar crystals or salt crystals, so as to be able to coat the particles of sugar or salt.

When the powdery material is supplied by means of conveying compressed air, the problem appears that optimal agglomerates must be produced or the drying and agglomeration process must be performed with the most suitable rate of the air flow and the most suitable solvent. In accordance with the invention, an apportioning device 12 (FIGS. 6 and 7) is used for the addition of the active powdery material by means of a conveying stream of compressed air. The apportioning device includes a storage product container 13, which tapers conically in a downward direction, for the active powdered material, and in which a screw spindle 15 has been mounted that may be driven by a driving motor 14 at an adjustable speed of rotation by means of a drive belt 22 (see FIG. 6), and the end of which that faces the tapered bottom part of the storage container 13 for the active substance has been provided with an apportioning worm conveyor 16. Strippers 17 have been mounted on the screw spindle 15 and extend along the inner side of the wall of the storage container 13 for the active substance. The outlet end of the apportioning worm conveyor 16 is connected, by means of a quick coupling 18, with an injection nozzle 19 that is acted upon by conveying compressed air therethrough with adjustable pressure, which has been designed in the form of a venturi pipe, and which is connected, by way of a connecting pipe 20, with the outlet spray nozzle 11, which is situated in the product container 5 of the rotary granulator 1. The powdery substance can also be blown into the granulator through an opening below the surface of the material to be processed.

Figure 6:
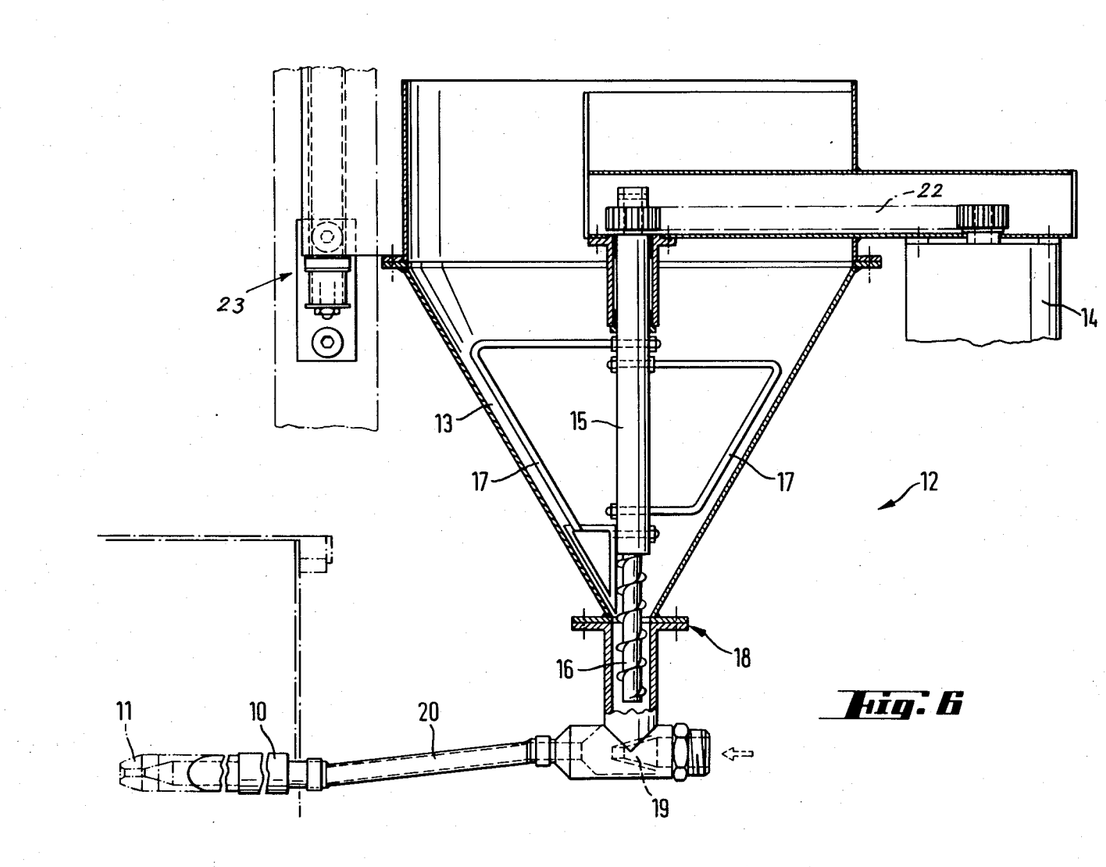
FIG. 6 shows a fragmentary cross-sectional view of the apportioning equipment for the addition of active powdery substance, with a powder-product container and an injection nozzle that may be connected with same.
Figures 7, 7A:
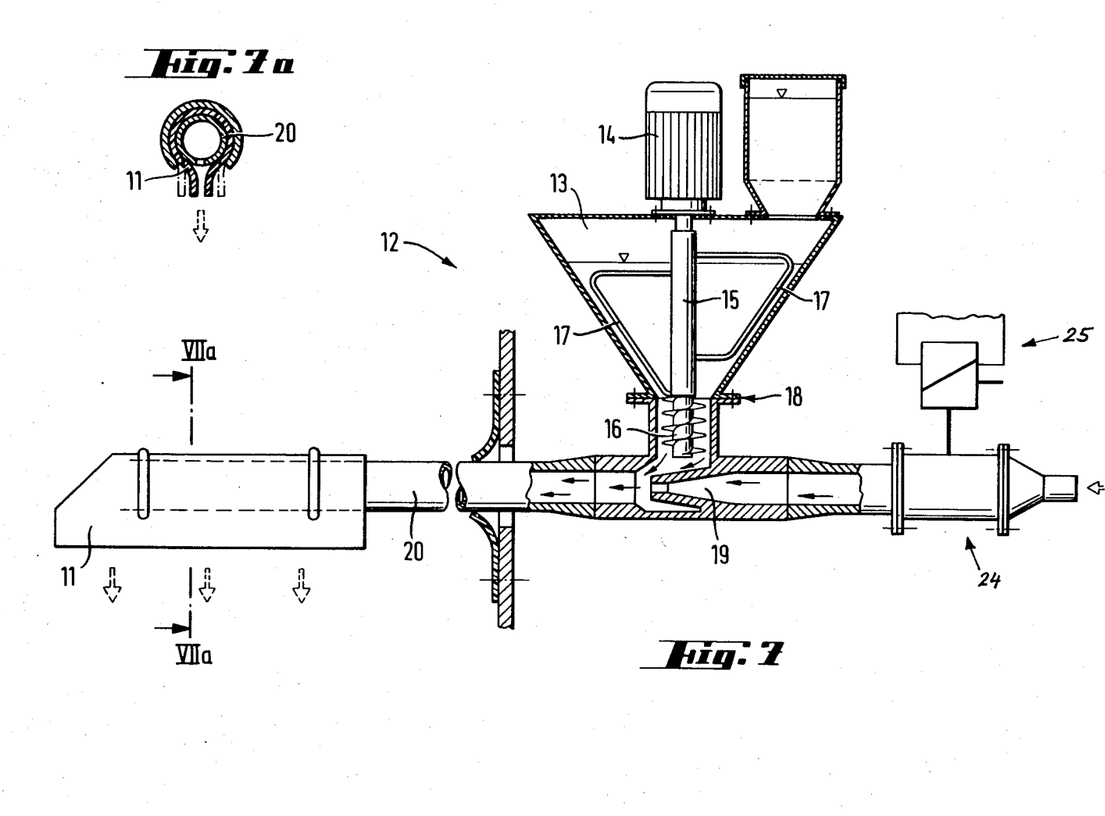
FIG. 7 shows a longitudinal section of the apportioning equipment in accordance with FIG. 6.
FIG. 7a shows a section along the line VIIa—VIIa of FIG. 7.
Figure 8:
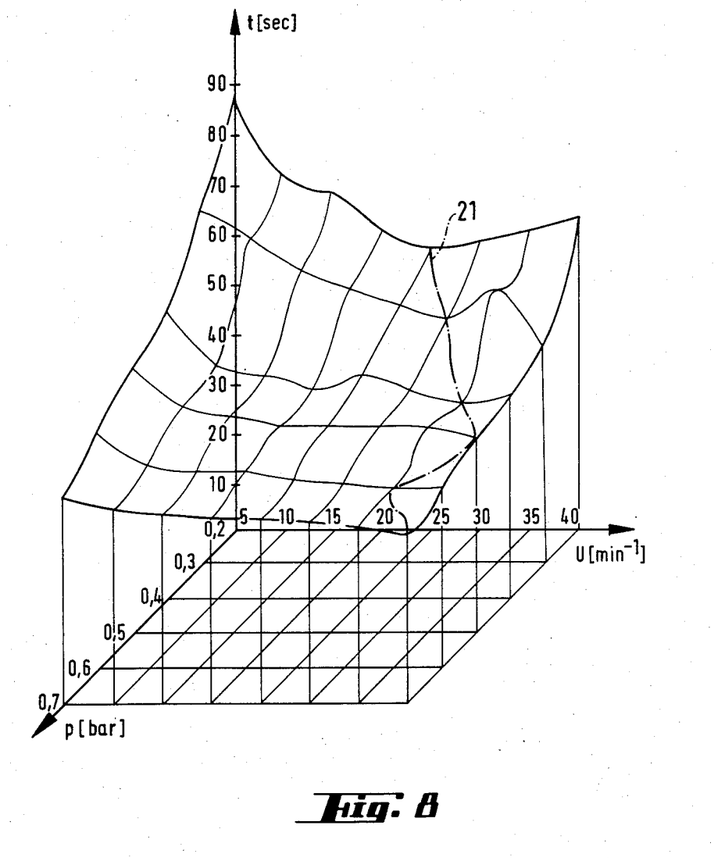
FIGS. 8 to 13 are three-dimensional diagrams showing the results of tests performed with the aid of the apportioning equipment, based upon various active powdery substances, on various diameters of the nozzle, on various speeds of rotation of the worm conveyor to be fed, and on various compressed delivery air pressures.
Figure 9:
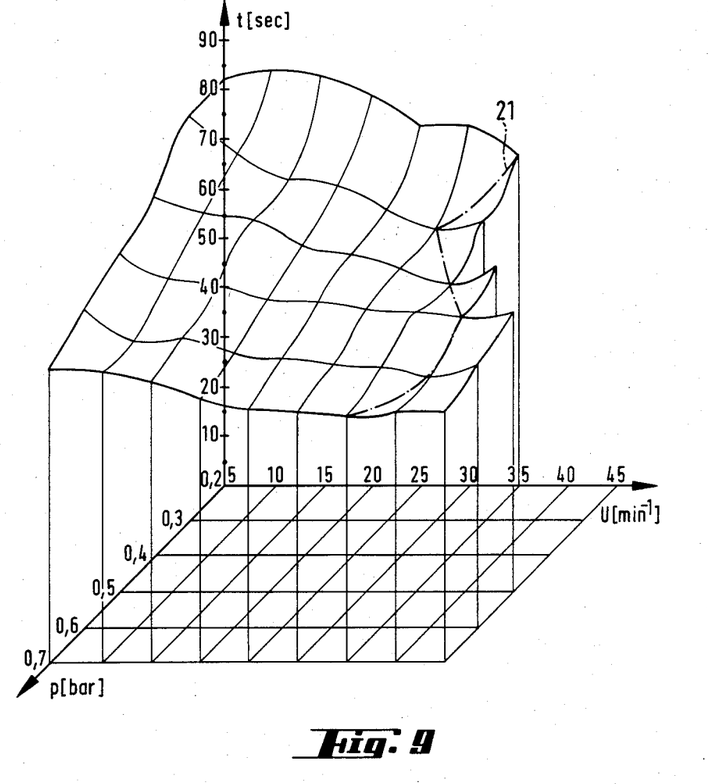
Figure 10:
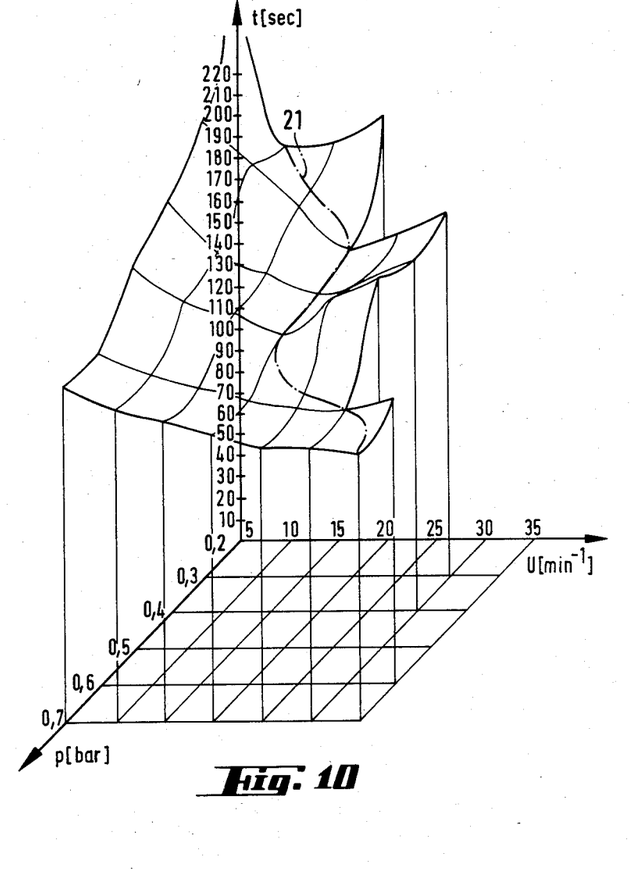
Figure 11:
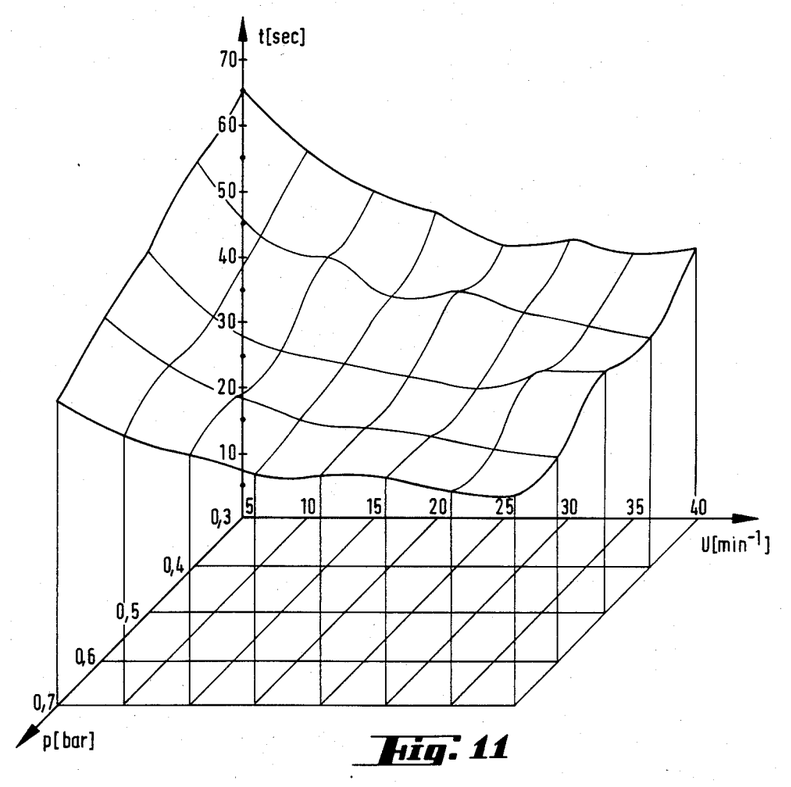
Figure 12:
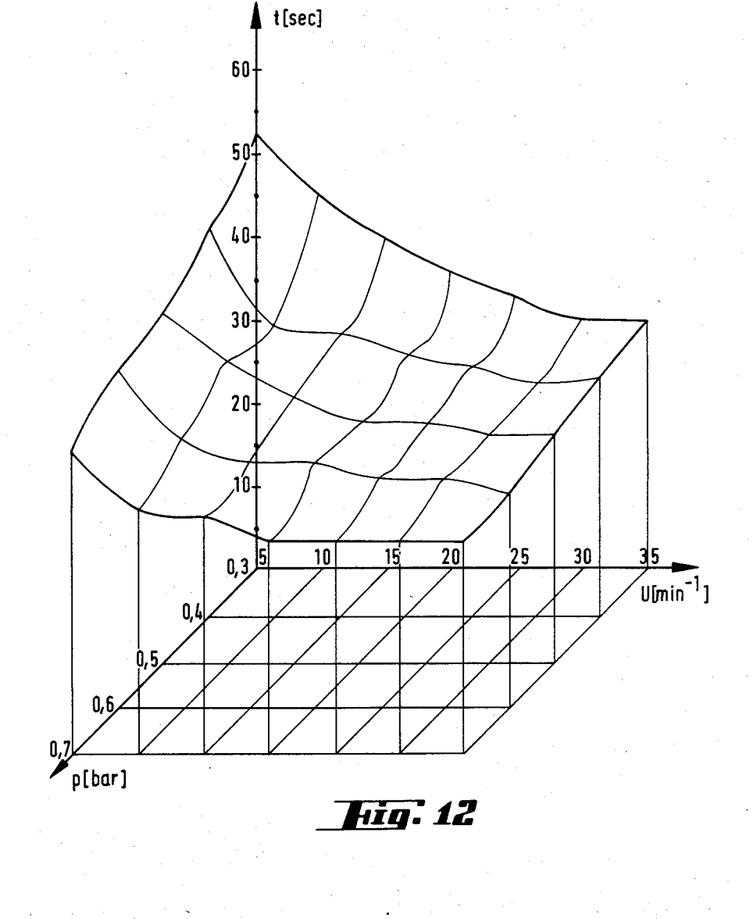

The operation of the apportioning device 12 is as follows: The receiving material in the product container 5 of the rotary granulator 1 is to receive active powdery substances to be supplied. The substances are located in the storage container 13, are loosened by the strippers 17 which are mounted on the screw spindle 15, and are introduced by the apportioning worm conveyor 16, which may be driven at an adjustable speed, at injection nozzle 19. The substance is acted upon by conveying compressed air with an adjustable pressure through nozzle 19 and the nozzle structure has a shape similar to a venturi pipe. The substance is drawn by the compressed air delivery stream from the nozzle and introduced, by way of the connecting pipe 20, into the receiving material located in the product container 5 of the rotary granulator 1. During this process, the apportioning equipment 12 may be operated on the one hand by setting the speed of rotation of the screw spindle 15, and on the other hand by adjusting the amount of the conveying compressed air that acts upon the injection nozzle 19. It may be learned from the examples of tests cited below which difficulties appear during apportioning when some types of products cannot be easily apportioned to a sufficient extent.

So as to obtain an additional control factor for the apportionment, a further development can be employed in which an interrupter for the conveying compressed air acting upon the injection nozzle 19 is used, by means of which interrupter a pulsating compressed air conveying stream is achieved. The number of interruptions per unit time may be regulated, so that within the compressed air conveying stream a certain free space will appear at intervals, into which space the active powdery substance to be introduced will be blown. The injection nozzle 19 may also provide a secondary air stream by means of introducing secondary air, through a second nozzle defined by an additional jacket tube (see FIG. 7a) that envelops the blow-off nozzle 11 coaxially, into the receiving material located in the product container 5 of the rotary granulator 1.

Liquid binder material required by the processing action may be fed into the same areas as the supplying of the active powdered substance by a jacket tube that is coaxial with the injection nozzle; it may also, in accordance with a further development of the design, be fed in through an individual opening at another point, preferably at a point displaced by between 0° and 180° from the powdered substance feed point.

Figure 13:
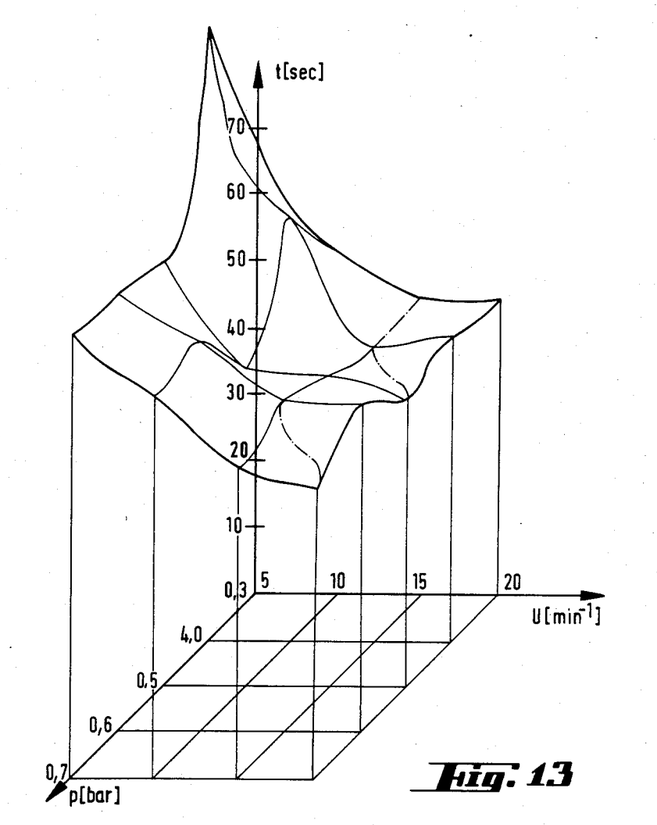

In FIGS. 8 to 12 of the drawings, diagrams of results of tests performed are shown, in which the feeding-in of the active powdery substance is shown as a function of various diameters of the nozzle, on different speeds of rotation of the screw spindle, and on various pressures of the conveying compressed air in dependence on the time. In the diagram shown in FIG. 8, a contour line is shown by reference numeral 21 for a test performed in which the nozzle has a diameter of 10 mm, the active substance is a corn starch-lactose microgranulate, and the quantity used amounts to 500 gm. According to FIG. 9, the diameter of the nozzle used is 8 mm, corn starch and lactose in the form of microgranulate as the active substance, and the quantity used is 500 gm. According to FIG. 10, the nozzle has a diameter of 6 mm, while corn starch-lactose-microgranulate was used as active substance, and the test quantity is 500 mm. According to FIG. 11, the nozzle has a diameter of 10 mm, the active substance used is corn starch, and the quantity used in the test is 500 gm. According to FIG. 12, the nozzle has a diameter of 8 mm, the active substance used is corn starch, and the test quantity is 250 gm. According to FIG. 13, the nozzle has a diameter of 6 mm, the active substance is corn starch and the test quantity is 100 gm.

What is claimed is:

1. A method for coating particulate materials with powdery materials, said method comprising:
    (a) providing a rotary granulator having a substantially horizontal rotary disc and containing particulate solids deposited on the disc, the solids to be coated with a powdery material;
    (b) rotating the rotary disc within the granulator to cause the particulate solids to rotate within the granulator and to undergo a spiral movement to form a helical bulge of material at the outer edge of the disc and an adjoining inner surface of the granulator;
    (c) providing a nozzle having an inlet connected to a source of compressed air and an outlet that is positioned in a connecting pipe that extends into the granulator, the connecting pipe having an inlet adjacent to the nozzle to permit powdery material to be introduced to the connecting pipe and having an outlet that opens into the granulator;
    (d) introducing a powdery substance into the granulator by passing a compressed air stream through the nozzle to draw the powdery material from a storage container that is in communication with the inlet to the connecting pipe to form a mixture of compressed air and the powdery substance; and
    (e) spraying the mixture of compressed air and powdery substance onto the surface of the bulge of particulate material as it undergoes spiral movement, to coat the particulate material with the powdery substance.

2. A method in accordance with claim 1, including feeding the powdery material to be added at a predetermined feed rate to the connecting pipe by feeding means including a rotatable proportioning screw, the feeding occurring adjacent the compressed air delivery stream leaving the nozzle and blown by it into the granulator.

3. A method in accordance with claim 1, including regulating the pressure of the compressed air delivery stream to provide a desired pressure level.

4. A method in accordance with claim 3, wherein the compressed air delivery stream is a pulsating air stream.

5. A method in accordance with claim 4, including periodically interrupting the flow of the compressed air delivery stream by means of time-controlled intermittent interruption of the flow from the compressed air supply.

6. A method in accordance with claim 1, including introducing an additional, secondary air stream into the granulator.

7. A method in accordance with claim 1, including blowing the powdery substance into the granulator below the surface of the particulate material.

8. A method in accordance with claim 1, including introducing a liquid binder material and a powdery material at spaced points into the granulator, which points are arranged at angular spacings ranging from 0° to 180°.

9. Apparatus for the addition of powdery substances to a rotary granulator by means of a compressed air delivery stream, said apparatus comprising:
    a rotary granulator having a rotor disc positioned for rotation within a product container;
    first conduit means opening substantially radially into said product container;
    nozzle means for providing delivery of compressed air, the nozzle means in communication with said first conduit means;
    second conduit means having an outlet in communication with said first conduit means at a point adjacent to the nozzle means for delivering a powdery substance; and
    conveying means for positively conveying said powdery substance from a powdery substance storage means through said second conduit means and to a point adjacent said nozzle means.

10. Apparatus in accordance with claim 9, wherein the first conduit means opens into the product container of the rotary granulator below the surface of the material to be processed.

11. Apparatus in accordance with claim 9, including interrupting means for interrupting the delivery of compressed air supplied to the nozzle means, the interruptions being regulatable to occur within a predetermined time period.

12. Apparatus in accordance with claim 9, including second nozzle means positioned at the outlet of the first conduit means and coaxially therewith, said second nozzle means opening into the product container of the rotary granulator and including a jacket tube for conveying a secondary air stream into the product container.

13. Apparatus in accordance with claim 9, including a jacket tube for conveying liquid binder material into the product container, said jacket tube being coaxial with the injection nozzle that opens into the product container.

14. Apparatus in accordance with claim 13, wherein the liquid binder material and the powdery substance are each introduced into the product container of the rotary granuator by way of individual openings positioned at angular spacings ranging from 0° to 180°.

* * * * *